(12) United States Patent
Burghardt et al.

(10) Patent No.: US 8,017,047 B2
(45) Date of Patent: Sep. 13, 2011

(54) MICROCAPSULES COMPRISING COMPOUNDS CONTAINING CARBODIIMIDE GROUPS

(75) Inventors: Andre Burghardt, Konstancin Jeziorna (PL); Maria Teresa Hechavarria Fonseca, Buerstadt (DE); Karl Haeberle, Speyer (DE); Oliver Hartz, Limburgerhof (DE); Marc Rudolf Jung, Worms (DE); Karl-Heinz Schumacher, Neustadt (DE); Denise du Fresne von Hohenesche, Mannheim (DE); Hans-Peter Hentze, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/517,481

(22) PCT Filed: Dec. 11, 2007

(86) PCT No.: PCT/EP2007/063683
§ 371 (c)(1),
(2), (4) Date: Jun. 3, 2009

(87) PCT Pub. No.: WO2008/077766
PCT Pub. Date: Jul. 3, 2008

(65) Prior Publication Data
US 2010/0065209 A1 Mar. 18, 2010

(30) Foreign Application Priority Data
Dec. 22, 2006 (EP) .................................... 06126994

(51) Int. Cl.
*B32B 37/12* (2006.01)
*B32B 27/00* (2006.01)

(52) U.S. Cl. .................. 264/4.7; 156/326; 428/402.21; 524/195

(58) Field of Classification Search ............... 264/4–4.7; 402/2; 428/321.5, 402–402.24, 423, 1; 430/530, 430/527, 531; 156/326; 424/493, 497; 347/20; 423/338; 435/283.1, 307.1; 427/389.9, 213.3–213.36; 525/501, 131
See application file for complete search history.

(56) References Cited

U.S. PATENT DOCUMENTS

| | | | |
|---|---|---|---|
| 3,412,054 A | 11/1968 | Milligan et al. | |
| 3,905,929 A | 9/1975 | Noll | |
| 3,920,598 A | 11/1975 | Reiff et al. | |
| 4,192,937 A | 3/1980 | Noll et al. | |
| 4,269,748 A | 5/1981 | Maeda et al. | |
| 4,292,226 A | 9/1981 | Wenzel et al. | |
| 2003/0104215 A1* | 6/2003 | Licht et al. | 428/423.1 |
| 2005/0085616 A1* | 4/2005 | Licht et al. | 528/61 |
| 2006/0073334 A1* | 4/2006 | Schwantes et al. | 428/402.2 |
| 2006/0194939 A1 | 8/2006 | Licht et al. | |

FOREIGN PATENT DOCUMENTS

| | | |
|---|---|---|
| CA | 1 129 128 | 8/1982 |
| DE | 1 495 745 | 6/1969 |
| DE | 1 954 090 | 5/1971 |
| DE | 2 034 479 | 1/1972 |
| DE | 39 11 827 | 10/1990 |
| DE | 44 19 518 | 12/1995 |
| DE | 44 35 422 | 4/1996 |
| DE | 44 35 423 | 4/1996 |
| DE | 199 60 864 | 6/2001 |
| DE | 101 39 171 | 2/2003 |
| DE | 103 30 748 | 1/2005 |
| DE | 10 2004 063 380 | 7/2006 |
| EP | 0 622 378 | 11/1994 |
| EP | 1 029 018 | 8/2000 |
| EP | 1 321 182 | 6/2003 |
| WO | 99 24525 | 5/1999 |
| WO | 02 48278 | 6/2002 |
| WO | 03 068703 | 8/2003 |
| WO | 2006 053714 | 5/2006 |
| WO | 2007 104640 | 9/2007 |

OTHER PUBLICATIONS

Fox, T.G., Bull. Am. Phys. Soc., (Ser. II), vol. 1, p. 123 (1956).
U.S. Appl. No. 12/812,325, filed Jul. 9, 2010, Hantze, et al.
U.S. Appl. No. 12/921,683, filed Sep. 9, 2010, Koplin, et al.

* cited by examiner

*Primary Examiner* — James Seidleck
*Assistant Examiner* — S. Camilla Pourbohloul
(74) *Attorney, Agent, or Firm* — Oblon, Spivak, McClelland, Maier & Neustadt, L.L.P.

(57) ABSTRACT

Microcapsules wherein
the capsule wall is formed from an organic polymer (capsule wall polymer for short) and
the core of the microcapsules comprises compounds containing carbodiimide groups (carbodiimide compound for short).

33 Claims, No Drawings

MICROCAPSULES COMPRISING COMPOUNDS CONTAINING CARBODIIMIDE GROUPS

The invention relates to microcapsules having a capsule wall composed of an organic polymer (capsule wall polymer for short), the core of the microcapsules comprising compounds containing carbodiimide groups (carbodiimide compound for short).

As adhesives it is common to use aqueous polymer dispersions. It is also widespread practice to add a crosslinker to the dispersion in order to ensure that the adhesively bonded assembly has sufficient heat stability. Carbodiimide compounds as crosslinkers are known—for example, from WO 03/068703 and DE-A 10 2004 063 380. The carbodiimide compounds are themselves in the form of aqueous dispersions, and are added as crosslinkers to adhesives or other coating materials, for example. The resulting mixtures are of limited shelf life. There is a desire to extend the shelf life in order to allow storage times of arbitrary length.

Furthermore, the performance properties of the mixtures ought to be very good. Particular importance attaches to use as adhesive, as for example a laminating adhesive, as is also described in DE-A 103 30 748, for example. The intention is to obtain further improvement in the performance properties of the adhesives used for lamination. Besides effective adhesion to the substrates that are to be bonded, there is a need for high strength in the resultant assembly, not least at high temperatures (heat stability).

DE-A 199 60 864 discloses the use of carbodiimide compounds as crosslinkers in emulsion polymers: the carbodiimide compounds are used as early as during the emulsion polymerization, so that emulsion polymers are formed which comprise the carbodiimide compounds in dissolved form.

Microcapsules are known per se and are used for encapsulating a very wide variety of substances; by way of example, reference may be made to WO 2006/053714.

It was an objective of the invention to improve the shelf life of mixtures, especially adhesives, which comprise carbodiimide compounds. A further object was to improve or at least retain the performance properties of these adhesives.

Found accordingly have been the microcapsules defined at the outset, and also adhesives, especially laminating adhesives, which comprise these microcapsules.

The Microcapsule

The microcapsules of the invention are composed essentially of the capsule wall and of the active substance which is enclosed within the core of the microcapsule and in this case is at least one compound containing carbodiimide groups (carbodiimide compound for short).

Microcapsules having an organic polymer as capsule wall and an enclosed active substance are known per se, from WO 2006/053714, for example.

The Capsule Wall

As polymer for the capsule wall it is possible to use the polymers that are customary for this purpose.

The capsule wall polymer is preferably composed of a polymer obtainable by free-radical polymerization. The capsule wall, or the capsule wall polymer, correspondingly, is obtainable by free-radical polymerization of ethylenically unsaturated compounds (monomers).

With particular preference more than 30%, in particular more than 50%, very preferably more than 80% by weight of the capsule wall polymer is composed of monomers containing an acrylic or methacrylic group, in particular $C_1$ to $C_{10}$ alkyl(meth)acrylates.

The capsule wall polymer may also comprise monomers containing two or more ethylenically unsaturated, copolymerizable groups (crosslinking monomers). These monomers lead to crosslinking. Crosslinking monomers, and a crosslinking procedure, are not absolutely necessary in the present case, but are not a hindrance either; the fraction of crosslinking monomers in the capsule wall polymer is therefore 0% to 30%, in particular 0% to 20%, and with particular preference 0% to 10%, by weight, based on the capsule wall polymer.

The glass transition temperature of the capsule wall polymer can be −60 to 150° C., preferably −40 to 100° C., in one particular embodiment 0 to 100° C., in particular 0 to 80° C., and with very particular preference 40 to 80° C.; the aforementioned glass transition temperature is the glass transition temperature calculated by the method of Fox (see also Handbook of Polymer Science and Technology, 1989 or T. G. Fox, Bull. Am. Phys. Soc. (Ser. II) 1, 123, 1956) from the weight fraction of the monomers and the glass transition temperature of the homopolymers, in a calculation which does not take account of monomers containing two or more than two copolymerizable, ethylenically unsaturated groups; in other words, the sum of all the other monomers corresponds to 100% by weight.

The capsule wall is preferably composed of a polymer synthesized from

30% to 100% by weight of at least two different monomers (monomers I) from the group comprising $C_1$-$C_{24}$ alkyl esters of acrylic and/or methacrylic acid, 0% to 30% by weight of one or more difunctional or polyfunctional monomers (monomers II) insoluble or of sparing solubility in water, and 0% to 30% by weight of one or more other monomers (monomers III), based in each case on the total weight of the monomers, the monomers I comprising 10% to 90% by weight, based on the total amount of the monomers I, of at least one monomer Ia whose homopolymer has a glass transition temperature ≦60° C.

The polymers of the capsule wall comprise in general at least 30%, in a preferred form at least 40%, in a particularly preferred form at least 50%, in particular at least 60%, with very particular preference at least 70%, and also up to 100% by weight of at least two different monomers I from the group comprising $C_1$-$C_{24}$ alkyl esters of acrylic and/or methacrylic acid, in copolymerized form, based on the total weight of the monomers. These monomers I comprise 10% to 90%, preferably 10% to 70%, in particular 15% to 50% by weight, based on the total amount of the monomers I, of least one monomer Ia which is capable of forming a homopolymer having a glass transition temperature (Tg) of ≦60° C., preferably ≦50° C., more preferably ≦40° C.

The glass transition temperature (Tg) of a polymer is defined in the Encyclopedia of Chemical Technology, Volume 19, 4th edition, page 891, as the temperature below which the Brownean molecular motions of relatively long chain segments (20-50 chain atoms) of the polymers are frozen. Below its glass transition temperature, a polymer exhibits neither flow behavior nor rubber elasticity. The glass transition temperature is determined by means of DSC in accordance with DIN 53765: 1994-03.

Moreover, the capsule wall polymers may comprise in general up to 30%, preferably not more than 25%, and in a particularly preferred form not more than 20%, by weight of a difunctional or polyfunctional monomer, as monomers II, which is insoluble or of sparing solubility in water, in copolymerized form.

In addition the polymers may comprise in copolymerized form up to 30%, preferably up to 20%, by weight of other monomers, monomers III.

With preference the capsule wall is synthesized only from monomers of groups I and III. With particular preference the capsule walls are synthesized substantially, and preferably exclusively, from monomers of group I.

Suitable monomers I include the $C_1$-$C_{24}$ alkyl esters of acrylic and/or methacrylic acid. By way of example mention may be made of methyl, ethyl, n-propyl, isopropyl, n-butyl, isobutyl, sec-butyl, and tert-butyl acrylate and 2-ethylhexyl acrylate, and also methyl, ethyl, n-propyl, isopropyl, n-butyl, isobutyl, sec-butyl, and tert-butyl methacrylate.

Suitable monomers Ia whose homopolymer has a glass transition temperature (Tg) of $\leq 60°$ C. are for example the $C_1$-$C_{24}$ alkyl esters of acrylic acid and butyl methacrylate. By way of example mention may be made of methyl acrylate, ethyl acrylate, propyl acrylate, n-butyl acrylate, tert-butyl acrylate, n-pentyl acrylate, 2-methylbutyl acrylate, 3-methylbutyl acrylate, hexyl acrylate, ethylhexyl acrylate, and propylheptyl acrylate. Preference is given to n-butyl acrylate.

Suitable monomers II are difunctional or polyfunctional monomers which are insoluble or of sparing solubility in water but have good to limited solubility in the lipophilic substance. By sparing solubility is meant a solubility of less than 60 g/l at 20° C. By difunctional or polyfunctional monomers are meant compounds which have at least two nonconjugated ethylenic double bonds. Principally suitable are divinyl and polyvinyl monomers, which bring about crosslinking of the capsule wall during the polymerization.

Suitable divinyl monomers are divinylbenzene, trivinylbenzene, divinylcyclohexane, and trivinylcyclohexane. Preferred divinyl monomers are the diesters of diols with acrylic acid or methacrylic acid, and also the diallyl and divinyl ethers of these diols. By way of example mention may be made of ethanediol diacrylate, ethylene glycol dimeth-acrylate, 1,3-butylene glycol dimethacrylate, methallylmethacrylamide, allyl acrylate, and allyl methacrylate. Particular preference is given to propanediol, butanediol, pentanediol, and hexanediol diacrylate, and the corresponding methacrylates.

Preferred polyvinyl monomers are the polyesters of polyols with acrylic acid and/or methacrylic acid, and also the polyallyl and polyvinyl ethers of these polyols.

Preference is given to trimethylolpropane triacrylate and methacrylate, pentaerythritol triallyl ether, pentaerythritol tetraallyl ether, pentaerythrityl triacrylate, and pentaerythrityl tetraacrylate, and also their technical mixtures.

Suitable monomers III include other monoethylenically unsaturated monomers other than monomers (I), preferably monomers IIIa such as vinyl acetate, vinyl propionate and vinylpyridine.

Particular preference is given to the water-soluble monomers IIIb, examples being acrylonitrile, methacrylamide, acrylic acid, methacrylic acid, itaconic acid, maleic acid, maleic anhydride, N-vinylpyrrolidone, 2-hydroxyethyl acrylate and methacrylate, and acrylamido-2-methylpropanesulfonic acid. Mention may be made in addition of, in particular, N-methylolacrylamide, N-methylolmethacrylamide, dimethylaminoethyl methacrylate, and diethylaminoethyl methacrylate.

The capsule wall polymer comprises functional groups, especially acid groups, carboxylic acid groups for example, which are able to crosslink with carbodiimide groups, in only small amounts or not at all; the amount of monomers containing acid groups, especially carboxylic acid groups, is preferably less than 20% by weight, more preferably less than 10%, in particular less than 5%, and very preferably less than 2% by weight or 0%.

The Core Material

The microcapsules comprise as active substance at least one compound containing carbodiimide groups.

Suitable compounds containing carbodiimide groups comprise in general on average 1 to 20, preferably 1 to 15, more preferably 2 to 10 carbodiimide groups.

The number-average molar weight Mn of the carbodiimide compounds is preferably 100 to 10 000, more preferably 200 to 5000, and in particular 500 to 2000 g/mol.

The number-average molecular weight is determined by means of endgroup analysis of the diisocyanates (i.e, consumption of the isocyanate groups by carbodiimide formation; see below) or, if endgroup analysis is not possible, by gel permeation chromatography (polystyrene standard, THF as eluent).

Carbodiimide groups are easily obtainable from two isocyanate groups, with elimination of carbon dioxide:

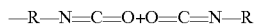

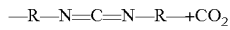

Starting from polyisocyanates, or diisocyanates, it is possible in this way to obtain carbodiimides containing two or more carbodiimide groups and, if appropriate, isocyanate groups, especially terminal isocyanate groups.

Examples of suitable diisocyanates include diisocyanates $X(NCO)_2$, where X is an aliphatic hydrocarbon radical having 4 to 12 carbon atoms, a cycloaliphatic or aromatic hydrocarbon radical having 6 to 15 carbon atoms or an araliphatic hydrocarbon radical having 7 to 15 carbon atoms. Examples of diisocyanates of this kind are tetramethylene diisocyanate, hexamethylene diisocyanate, dodecamethylene diisocyanate, 1,4-diisocyanatocyclohexane, 1-isocyanato-3,5,5-trimethyl-5-isocyanato-methylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanato-toluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of these compounds.

TMXDI is particularly preferred.

As a result of the terminal isocyanate group the carbodiimides can easily be hydrophilically modified, by reaction with amino acids or hydroxy acids, for example. Hydrophilically modified carbodiimides are of course easier to mix with aqueous adhesives or with adhesives based on hydrophilic polymers.

With similar ease it is possible to attach the carbodiimides to polymers, by reacting the isocyanate group with a reactive group of the polymer, such as an amino group or hydroxyl group.

For the use in microcapsules there is no need for any hydrophilic modification of the carbodiimide compounds. If appropriate, however, it is advantageous to block the terminal isocyanate groups, so that the carbodiimide compounds have nonreactive end groups. For this purpose the terminal isocyanates are with particular preference reacted with compounds which have only one isocyanate-reactive group, such as with monohydric alcohols.

General Remarks

The microcapsule is composed preferably and essentially of the capsule wall and the carbodiimide compound enclosed within the core. Besides the capsule wall polymer, the capsule wall may comprise further constituents. In particular, protective colloids which have been used in the production of the microcapsule may be a constituent of the capsule wall and may be located on the outer surface.

The weight ratio of enclosed carbodiimide compound to capsule wall (including protective colloid and other constituents, if appropriate) is generally from 50:50 to 95:5. Preference is given to a core/wall ratio of 70:30 to 93:7.

The weight-average particle size of the capsules (Z-average by means of light scattering) is preferably at least 0.5, in particular at least 1 µm; suitable particle sizes are situated for example within the range from 0.5 to 50 µm, preferably 1 to 30 µm, more preferably 5 to 30 µm.

Production of the Capsules

The microcapsules can be prepared by what is called an in situ polymerization. The principle of microcapsule formation is based on the use of the monomers, a free-radical initiator, a protective colloid, and the lipophilic substance for encapsulation (in this case the carbodiimide compound) to prepare a stable oil-in-water emulsion. Then the polymerization of the monomers is triggered by heating and is controlled if appropriate by raising the temperature further, with the resulting polymers forming the capsule wall that envelops the lipophilic substance. This general principle is described for example in DE-A 101 39 171, whose content is hereby expressly incorporated by reference.

The microcapsules are generally produced in the presence of at least one organic or inorganic protective colloid. Both organic and inorganic protective colloids may be ionic or neutral. Protective colloids may be used either individually or in mixtures of two or more protective colloids each with the same or different charge.

Organic protective colloids are preferably water-soluble polymers which lower the surface tension of water from a maximum of 73 nM/m to 45 to 70 nM/m and so ensure the formation of coherent capsule walls, and also form microcapsules having particle sizes in the range from 0.5 to 50 µm, preferably 0.5 to 30 µm, in particular 0.5 to 10 µm.

Examples of organic neutral protective colloids are cellulose derivatives such as hydroxyethylcellulose, methylhydroxyethylcellulose, methylcellulose, and carboxy-methylcellulose, polyvinylpyrrolidone, vinylpyrrolidone copolymers, gelatin, gum arabic, xanthan, casein, polyethylene glycols, polyvinyl alcohol and partially hydrolyzed polyvinyl acetates, and also methylhydroxypropylcellulose. Preferred organic neutral protective colloids are polyvinyl alcohol and partially hydrolyzed polyvinyl acetates, and methylhydroxypropylcellulose.

Generally speaking, polyvinyl alcohol or partially hydrolyzed polyvinyl acetate is used in a total amount of at least 3% by weight, preferably from 6% to 8% by weight, based on the microcapsules (without protective colloid). In this context it is possible to add further aforementioned protective colloids in addition to the preferred amounts of polyvinyl alcohol or partially hydrolyzed polyvinyl acetate. The microcapsules are preferably produced only with polyvinyl alcohol and/or partially hydrolyzed polyvinyl acetate and without addition of further protective colloids.

Polyvinyl alcohol is obtainable by polymerizing vinyl acetate, in the presence if appropriate of comonomers, and hydrolyzing the polyvinyl acetate, with elimination of the acetyl groups and formation of hydroxyl groups. The degree of hydrolysis of the polymers may for example be 1% to 100% and is situated preferably in the range from 50% to 100%, in particular from 65% to 95%. By partially hydrolyzed polyvinyl acetates is meant in the context of this specification a degree of hydrolysis of <50% and, by polyvinyl alcohol, of ≧50% to 100%. The preparation of homopolymers and copolymers of vinyl acetate and the hydrolysis of these polymers to form polymers comprising vinyl alcohol units is common knowledge. Polymers comprising vinyl alcohol units are sold for example as Mowiol® products by Kuraray Specialities Europe (KSE).

Preferred polyvinyl alcohols or partially hydrolyzed polyvinyl acetates are those for which the viscosity of a 4% strength by weight aqueous solution at 20° C. in accordance with DIN 53015 has a value in the range from 3 to 56 mPa*s, preferably a value of 14 to 45 mPa*s, in particular of 22 to 41 mPa*s. Preferred polyvinyl alcohols have a degree of hydrolysis of ≧65%, preferably ≧70%, in particular ≧75%.

Organic anionic protective colloids are sodium alginate, polymethacrylic acid and its copolymers, the copolymers of sulfoethyl acrylate and methacrylate, of sulfopropyl acrylate and methacrylate, of N-(sulfoethyl)maleimide, of 2-acrylamido-2-alkylsulfonic acids, of styrenesulfonic acid, and of vinylsulfonic acid. Preferred organic anionic protective colloids are naphthalenesulfonic acid and naphthalenesulfonic acid-formaldehyde condensates, and, in particular, polyacrylic acids and phenolsulfonic acid-formaldehyde condensates.

Inorganic protective colloids include what are called Pickering systems, which allow stabilization by means of very fine, solid particles and are insoluble but dispersible in water or are insoluble and nondispersible in water, but are wettable by the lipophilic substance. The mode of action and their use are described in EP-A 1 029 018 and also EP-A 1 321 182, the content of which is hereby expressly incorporated by reference.

A Pickering system may be composed of the solid particles alone, or may additionally be composed of auxiliaries which enhance the dispersiblity of the particles in water or enhance the wettability of the particles by the lipophilic phase.

The inorganic solid particles may be metal salts, such as salts, oxides, and hydroxides of calcium, magnesium, iron, zinc, nickel, titanium, aluminum, silicon, barium, and manganese. Included are magnesium hydroxide, magnesium carbonate, magnesium oxide, calcium oxalate, calcium carbonate, barium carbonate, barium sulfate, titanium dioxide, aluminum oxide, aluminum hydroxide, and zinc sulfide. Silicates, bentonite, hydroxyapatite, and hydrotalcites may likewise be mentioned. Particular preference is given to highly disperse silicas, magnesium pyrophosphate, and tricalcium phosphate.

The Pickering systems may either first be added to the water phase or else added to the stirred oil-in-water emulsion. Certain fine, solid particles are prepared by precipitation, as described in EP-A 1 029 018, and also in EP-A 1 321 182.

The highly disperse silicas can be dispersed as fine, solid particles in water. An alternative option is to use what are known as colloidal dispersions of silica in water. Such colloidal dispersions are alkaline, aqueous mixtures of silica. In the alkaline pH range the particles are swollen and are stable in water. For the use of these dispersions as a Pickering system it is advantageous for the pH of the oil-in-water emulsion to be adjusted with an acid to a pH of 2 to 7.

In general the protective colloids are used in amounts of 0.1% to 15% by weight, preferably from 0.5% to 10% by weight, based on the water phase. For inorganic protective colloids it is preferred to choose amounts of 0.5% to 15% by weight, based on the water phase. Organic protective colloids are used preferably in amounts of 0.1% to 10% by weight, based on the water phase of the emulsion.

In one embodiment preference is given to inorganic protective colloids and also to mixtures thereof with organic protective colloids.

In another embodiment preference is given to organic neutral protective colloids.

Protective colloids which carry OH groups, such as polyvinyl alcohols and partially hydrolyzed polyvinyl acetates, are preferred.

A further possibility for the purpose of costabilization is to add surfactants, preferably nonionic surfactants. Suitable surfactants can be found in the "Handbook of Industrial Surfactants", whose content is hereby expressly incorporated by reference. The surfactants can be used in an amount of 0.01% to 10% by weight, based on the water phase of the emulsion.

Free-radical initiators which can be used for the polymerization reaction that proceeds via a free-radical mechanism include the typical peroxo compounds and azo compounds, appropriately in amounts of 0.2% to 5% by weight, based on the weight of the monomers.

Depending on the aggregate state of the free-radical initiator and on its solubility characteristics, it can be supplied per se, but is preferably supplied as a solution, emulsion or suspension, which allows free-radical initiator to be metered more precisely, particularly when in small quantities.

Preferred free-radical initiators include tert-butyl peroxoneodecanoate, tert-amyl peroxypivalate, dilauroyl peroxide, tert-amyl peroxy-2-ethylhexanoate, 2,2'-azobis(2,4-dimethyl)valeronitrile, 2,2'-azobis(2-methyl butyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane, and cumene hydroperoxide.

Particularly preferred free-radical initiators are di(3,5,5-trimethylhexanoyl) peroxide, 4,4'-azobisisobutyronitrile, tert-butyl perpivalate, and dimethyl 2,2-azobisisobutyrate. These initiators have a half-life of 10 hours in a temperature range from 30 to 100° C.

In addition it is possible to add regulators known to the skilled worker to the polymerization, in typical amounts, such as tert-dodecyl mercaptan or ethylhexyl thioglycolate.

The dispersing conditions for the preparation of the stable oil-in-water emulsion are preferably chosen in conventional manner such that the oil droplets have the size of the desired microcapsules.

The polymerization is generally conducted at 40 to 150° C., preferably at 60 to 120° C. The dispersion temperature and polymerization temperature should of course lie above the melting temperature of the lipophilic substances.

In general the polymerization is conducted at 20 to 100° C., preferably at 40 to 95° C. Depending on the desired lipophilic substance, the oil-in-water emulsion should be formed at a temperature at which the core material is liquid/oily. It is necessary correspondingly to choose a free-radical initiator whose decomposition temperature is above this temperature and likewise to carry out the polymerization at 2 to 50° C. above this temperature, so that, if appropriate, free-radical initiators chosen are those whose decomposition temperature lies above the melting point of the lipophilic substance.

One common process variant for lipophilic substances having a melting point of up to about 60° C. is a reaction temperature which to begin with is 60° C. and which is increased in the course of the reaction to 85° C. Advantageous free-radical initiators have a 10-hour half-life in the range from 45 to 65° C., such as tert-butyl perpivalate.

According to a further process variant, for lipophilic substances with a melting point above 60° C., a temperature program is chosen that begins at correspondingly higher reaction temperatures. For starting temperatures around 85° C., preference is given to free-radical initiators having a 10-hour half-life in the range from 70 to 90° C., such as tert-butyl per-2-ethylhexanoate.

The polymerization is appropriately performed under atmospheric pressure, although it is also possible to operate under reduced or slightly elevated pressure, as for example in the case of a polymerization temperature above 100° C., in other words, for instance, in the range from 0.5 to 5 bar.

The reaction times of the polymerization amount normally to 1 to 10 hours, usually to 2 to 5 hours.

One inventive process variant using polyvinyl alcohol and/or partially hydrolyzed polyvinyl acetate permits an advantageous procedure in accordance with which dispersion and polymerization are carried out directly at an elevated temperature.

Subsequent to the actual polymerization reaction, at a conversion of 90% to 99% by weight, it is in general advantageous to make the aqueous microcapsule dispersions largely free from odoriferous substances, such as residual monomers and other volatile organic constituents. This can be done in a known way physically, by means of distillative removal (in particular via steam distillation) or by stripping with an inert gas. It may also take place chemically, as described in WO 99/24525, advantageously by means of redox-initiated polymerization, as described in DE-A 44 35 423, DE-A 44 19 518 and DE-A 44 35 422.

In this way it is possible to produce microcapsules having an average particle size in the range from 0.5 to 100 µm, the particle size being adjustable in conventional manner via the shearing force, the stirring speed, and the protective colloid and its concentration. Preferred microcapsules are those having an average particle size in the range from 0.5 to 50 µm, preferably 0.5 to 30 µm (Z-average by means of light scattering).

The microcapsules can be processed preferably directly as an aqueous dispersion.

Spray drying to a microcapsule powder is generally possible, but must take place gently.

Use as Crosslinker

The microcapsules are especially suitable as crosslinkers for polymer systems, particularly as crosslinkers for aqueous polymers, preferably for polymer dispersions.

The polymers to be crosslinked preferably comprise acid groups, more preferably carboxylic acid groups. These acid groups crosslink with the carbodiimide groups.

The microcapsules are suitable, for example, as crosslinkers for aqueous polyurethane dispersions or aqueous dispersions of polymers obtainable by free-radical polymerization (preferably by emulsion polymerization), and also, in particular, mixtures thereof.

The microcapsules are suitable as crosslinkers in adhesives, paints, varnishes, paper-coating slips or other coating or impregnating compositions.

With particular preference the microcapsules are used as crosslinkers in adhesives, more preferably aqueous adhesives. Adhesives of this kind comprise at least one polymeric binder and, if appropriate, additives such as fillers, thickeners, defoamers, dyes, pigments, etc.

The polymeric binder is preferably a polyurethane, a free-radically polymerized polymer, or mixtures thereof. The polymeric binders are preferably in the form of aqueous dispersions.

Suitable polyurethane or free-radically polymerized polymer includes in particular the polyurethane dispersions or emulsion polymers that are described in WO 03/068703 and DE 10 2004 063 380.

The polyurethanes are composed predominantly, preferably, of polyisocyanates, in particular diisocyanates and polyesterdiols, polyetherdiols or mixtures thereof.

Preferably at least 40% by weight, more preferably at least 60% by weight, and very preferably at least 80% by weight of the polyurethane is synthesized from diisocyanates, polyetherdiols and/or polyesterdiols.

The polyurethane preferably has a softening point or melting point in the range from −50 to 150° C., more preferably from 0 to 100° C., and very preferably from 10 to 90° C.

With particular preference the polyurethane has a melting point within the above temperature range.

For this purpose the polyurethane preferably comprises polyesterdiols in an amount of more than 10% by weight, based on the polyurethane.

Overall the polyurethane is preferably synthesized from:
a) diisocyanates,
b) diols of which
   $b_{1)}$ from 10 to 100 mol %, based on the total amount of the diols (b), have a molecular weight of from 500 to 5000 g/mol, and
   $b_{2)}$ from 0 to 90 mol %, based on the total amount of the diols (b), have a molecular weight of from 60 to 500 g/mol,
c) monomers other than the monomers (a) and (b), having at least one isocyanate group or at least one group which is reactive toward isocyanate groups, said monomers further carrying at least one hydrophilic group or one potentially hydrophilic group which renders the polyurethanes dispersible in water,
d) if appropriate, further, polyfunctional compounds which are different than the monomers (a) to (c) and contain reactive groups which are alcoholic hydroxyl groups, primary or secondary amino groups or isocyanate groups, and
e) if appropriate, monofunctional compounds which are different than the monomers (a) to (d) and which have a reactive group which is an alcoholic hydroxyl group, a primary or secondary amino group or an isocyanate group.

As monomers (a) mention may be made in particular of diisocyanates X(NCO)$_2$, in which X is an aliphatic hydrocarbon radical having 4 to 15 carbon atoms, a cyclo-aliphatic or aromatic hydrocarbon radical having 6 to 15 carbon atoms or an araliphatic hydrocarbon radical having 7 to 15 carbon atoms. Examples of such diisocyanates include tetramethylene diisocyanate, hexamethylene diisocyanate, dodecamethylene diisocyanate, 1,4-diisocyanatocyclohexane, 1-isocyanato-3,5,5-trimethyl-5-isocyanato-methylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanato-toluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of these compounds.

Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is especially suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, the preferred mixing ratio of the aliphatic to the aromatic isocyanates being from 4:1 to 1:4.

The diols (b1) can be polyesterpolyols, which are known, for example, from Ullmanns Encyklopädie der technischen Chemie, 4th edition, volume 19, pp. 62 to 65. It is preferred to use polyesterpolyols obtained by reacting dihydric alcohols with dibasic carboxylic acids. Instead of the free polycarboxylic acids it is also possible to use the corresponding polycarboxylic anhydrides or corresponding carboxylic esters of lower alcohols or mixtures thereof to prepare the polyester polyols. The polycarboxylic acids can be aliphatic, cycloaliphatic, araliphatic, aromatic or heterocyclic and if appropriate may be substituted, by halogen atoms for example, and/or unsaturated. Examples that may be mentioned include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula HOOC—(CH$_2$)$_y$—COOH, in which y is a number from 1 to 20, preferably an even number from 2 to 20, examples being succinic acid, adipic acid, sebacic acid, and dodecanedicarboxylic acid.

Examples of suitable polyhydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis (hydroxymethyl)-cyclohexane, 2-methylpropane-1,3-diol, methylpentanediols, and also diethylene glycol, triethylene glycol, tetraethylene glycol, polyethylene glycol, dipropylene glycol, polypropylene glycol, and dibutylene glycol and polybutylene glycols. Preferred alcohols are of the general formula HO—(CH$_2$)$_x$—OH, in which x is a number from 1 to 20, preferably an even number from 2 to 20. Examples thereof are ethylene glycol, butane-1,4-diol, hexane-1,6-diol, octane-1,8-diol, and dodecane-1,12-diol. Preference further attaches to neopentyl glycol.

Also suitable, furthermore, if appropriate are polycarbonatediols, such as may be obtained, for example, by reacting phosgene with an excess of the low molecular mass alcohols mentioned as synthesis components for the polyester polyols.

If appropriate it is also possible to use lactone-based polyesterdiols, which are homopolymers or copolymers of lactones, preferably hydroxyl-terminated adducts of lactones with suitable difunctional starter molecules. Suitable lactones include preferably those derived from compounds of the general formula HO—(CH$_2$)$_z$—COOH in which z is a number from 1 to 20 and one H atom of a methylene unit may also be substituted by a C$_1$ to C$_4$ alkyl radical. Examples are ε-caprolactone, β-propiolactone, γ-butyrolactone and/or methyl-γ-caprolactone and also mixtures thereof. Examples of suitable starter components are the low molecular weight, dihydric alcohols specified above as a synthesis component for the polyesterpolyols. The corresponding polymers of ε-caprolactone are particularly preferred. Lower polyesterdiols or polyetherdiols can also be used as starters for preparing the lactone polymers. Instead of the polymers of lactones it is also possible to use the corresponding, chemically equivalent polycondensates of the hydroxycarboxylic acids corresponding to the lactones.

Polyetherdiols are obtainable in particular by polymerizing ethylene oxide, propylene oxide, butylene oxide, tetrahydrofuran, styrene oxide or epichlorohydrin with itself, in the presence for example of BF$_3$, or by subjecting these compounds, alone or in a mixture or in succession, to addition reaction with starter components containing reactive hydrogen atoms, such as alcohols or amines, e.g., water, ethylene glycol, propane-1,2-diol, propane-1,3-diol, 2,2-bis(4-hydroxyphenyl)propane or aniline. Particular preference is given to polypropylene oxide and to polytetrahydrofuran with a molecular weight of from 240 to 5000 and in particular from 500 to 4500.

$b_{1)}$ embraces only polyetherdiols consisting of less than 20% by weight of ethylene oxide. Polyetherdiols containing at least 20% by weight are hydrophilic polyetherdiols, which are included in monomers c).

If appropriate it is also possible to use polyhydroxyolefins, preferably those having two terminal hydroxyl groups, e.g., α,ω-dihydroxypolybutadiene, α,ω-dihydroxypolymethacrylic esters or α,ω-dihydroxypolyacrylic esters as monomers (c1). Such compounds are known from, for example, EP-A 622 378. Further suitable polyols are polyacetals, polysiloxanes, and alkyd resins.

With preference at least 95 mol % of the diols $b_{1)}$ are polyesterdiols. With particular preference polyesterdiols are used exclusively as diols $b_{1)}$.

The hardness and elasticity modulus of the polyurethanes can be increased by using as diols (b) not only the diols (b1) but also low molecular weight diols (b2) having a molecular weight of from about 60 to 500, preferably from 62 to 200 g/mol.

As monomers (b2) use is made in particular of the synthesis components of the short-chain alkanediols specified for the preparation of polyesterpolyols, preference being given to the unbranched diols having 2 to 12 C atoms and an even number of C atoms and also to pentane-1,5-diol and neopentyl glycol.

Examples of suitable diols b2) include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the general formula HO—$(CH_2)_x$—OH, in which x is a number from 1 to 20, preferably an even number from 2 to 20. Examples thereof are ethylene glycol, butane-1,4-diol, hexane-1,6-diol, octane-1,8-diol, and dodecane-1,12-diol. Preference further attaches to neopentyl glycol.

Based on the total amount of the diols (b) the fraction of the diols ($b_1$) is preferably from 10 to 100 mol % and the fraction of the monomers ($b_2$) is preferably from 0 to 90 mol % based on the total amount of diols (b). With particular preference the ratio of the diols (b1) to the monomers (b2) is from 0.1:1 to 5:1, more preferably from 0.2:1 to 2:1.

In order for the polyurethanes to attain dispersibility in water they comprise monomers (c) which are different than components (a), (b), and (d) and which carry at least one isocyanate group or at least one group which is reactive toward isocyanate groups and additionally at least one hydrophilic group or one group which can be converted into a hydrophilic group, as a synthesis component. In the text below the term "hydrophilic groups or potentially hydrophilic groups" is abbreviated to "(potentially) hydrophilic groups". The (potentially) hydrophilic groups react with isocyanates substantially more slowly than do the functional groups of the monomers which serve to synthesize the polymer main chain.

The proportion of the components containing (potentially) hydrophilic groups as a fraction of the total amount of components (a), (b), (c), (d), and (e) is generally calculated such that the molar amount of the (potentially) hydrophilic groups, based on the amount by weight of all monomers (a) to (e), is from 30 to 1000, preferably from 50 to 500, and more preferably from 80 to 300 mmol/kg.

The (potentially) hydrophilic groups can be nonionic or, preferably, (potentially) ionic hydrophilic groups.

As nonionic hydrophilic groups particular suitability is possessed by polyethylene glycol ethers composed of preferably from 5 to 100, more preferably from 10 to 80 repeating ethylene oxide units. The amount of polyethylene oxide units is generally from 0 to 10%, preferably from 0 to 6% by weight, based on the amount by weight of all monomers (a) to (e).

Preferred monomers containing nonionic hydrophilic groups are polyethylene oxide diols with at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in U.S. Pat. Nos. 3,905,929 and 3,920,598.

Ionic hydrophilic groups are, in particular, anionic groups such as the sulfonate, the carboxylate and the phosphate group in the form of their alkali metal or ammonium salts and also cationic groups such as ammonium groups, especially protonated tertiary amino groups or quaternary ammonium groups.

Potentially ionic hydrophilic groups are, in particular, those which can be converted by simple neutralization, hydrolysis or quaternization reactions into the above-mentioned ionic hydrophilic groups that is, for example, carboxylic acid groups or tertiary amino groups.

(Potentially) ionic monomers (c) are described in, for example, Ullmanns Encyklopädie der technischen Chemie, 4th edition, volume 19, pp. 311-313 and at length in DE-A 1 495 745, for example.

(Potentially) cationic monomers (c) of particular practical importance are, in particular, monomers containing tertiary amino groups, examples being the following: tris-(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, the alkyl radicals and alkanediyl units of these tertiary amines being composed, independently of one another, of 1 to 6 carbon atoms. Also suitable are polyethers containing tertiary nitrogen atoms and preferably two terminal hydroxyl groups, such as are obtainable in conventional manner by means, for example, of alkoxylating amines having two hydrogen atoms attached to amine nitrogen, e.g., methylamine, aniline or N,N'-dimethylhydrazine. Polyethers of this kind generally have a molar weight of between 500 and 6000 g/mol.

These tertiary amines are converted into the ammonium salts either with acids, preferably strong mineral acids such as phosphoric acid, sulfuric acid or hydrohalic acids or with strong organic acids or by reaction with suitable quaternizing agents such as $C_1$ to $C_6$ alkyl halides or benzyl halides, e.g., bromides or chlorides.

Suitable monomers containing (potentially) anionic groups are, customarily, aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially of 3 to 10 carbon atoms, as are also disclosed in U.S. Pat. No. 3,412,054. Particular preference is given to compounds of the general formula ($c_1$)

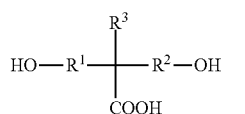

in which $R^1$ and $R^2$ are each a $C_1$ to $C_4$ alkanediyl (unit) and $R^3$ is a $C_1$ to $C_4$ alkyl (unit), and especially to dimethylolpropionic acid (DMPA).

Suitability is further possessed by corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 39 11 827. They can be obtained by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) mentioned as chain extenders and also the diols (b1).

Suitable monomers (c) containing isocyanate-reactive amino groups include amino-carboxylic acids such as lysine, β-alanine or the adducts of aliphatic diprimary diamines with α,β-unsaturated carboxylic or sulfonic acids that are specified in DE-A 20 34 479.

Such compounds conform, for example, to the formula ($c_2$)

in which
  $R^4$ and $R^5$ independently of one another are a $C_1$ to $C_6$ alkanediyl unit, preferably ethylene, and
  X is COOH or $SO_3H$.

Particularly preferred compounds of the formula ($c_2$) are N-(2-aminoethyl)-2-amino-ethanecarboxylic acid and also N-(2-aminoethyl)-2-aminoethanesulfonic acid and the corresponding alkali metal salts, with Na being a particularly preferred counterion.

Particular preference is also given to the adducts of the abovementioned aliphatic diprimary diamines with 2-acrylamido-2-methylpropanesulfonic acid, such as are described in, for example, DE-B 1 954 090.

Where monomers containing potentially ionic groups are used, they can be converted into the ionic form before, during or, preferably, after the isocyanate polyaddition, since the ionic monomers are frequently difficult to dissolve in the reaction mixture. With particular preference the sulfonate or carboxylate groups are in the form of their salts with an alkali metal ion or with an ammonium ion as counterion.

The monomers (d), which are different than the monomers (a) to (c) and which are also, if appropriate, constituents of the polyurethane, serve generally for crosslinking or chain extension. In general they are nonphenolic alcohols with a functionality of more than two, amines with two or more primary and/or secondary amino groups, and compounds which carry not only one or more alcoholic hydroxyl groups but also one or more primary and/or secondary amino groups.

Alcohols with a functionality of more than two that can be used to set a certain degree of branching or crosslinking are, for example, trimethylolpropane, glycerol or sucrose.

Others which come into consideration are monoalcohols which as well as the hydroxyl group carry a further isocyanate-reactive group, such as monoalcohols containing one or more primary and/or secondary amino groups, an example being monoethanol-amine.

Polyamines having two or more primary and/or secondary amino groups are used in particular when chain extension or crosslinking is to take place in the presence of water, since amines generally react faster with isocyanates than do alcohols or water. This is frequently necessary when the desire is for aqueous dispersions of crosslinked polyurethanes or of polyurethanes having a high molar weight. In such cases a procedure is followed in which isocyanato-containing prepolymers are prepared, are dispersed rapidly in water, and then are chain-extended or crosslinked by adding compounds having two or more isocyanate-reactive amino groups.

Amines suitable for this purpose are generally polyfunctional amines from the molar weight range from 32 to 500 g/mol, preferably from 60 to 300 g/mol, which comprise at least two amino groups selected from the group consisting of primary and secondary amino groups. Examples thereof are diamines such as diaminoethane, diamino-propanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines may also be employed in blocked form, e.g., in the form of the corresponding ketimines (see CA-A 1 129 128, for example), ketazines (see U.S. Pat. No. 4,269,748, for example) or amine salts (see U.S. Pat. No. 4,292,226). Oxazolidines as well, as used for example in U.S. Pat. No. 4,192,937, constitute blocked polyamines which, for the preparation of the polyurethanes of the invention, can be used for chain-extending the prepolymers. Where such blocked polyamines are used, they are generally mixed with the prepolymers in the absence of water to form a mixture which is subsequently combined with the dispersion water or with part of the dispersion water, such that the corresponding polyamines are released by hydrolysis.

It is preferred to use mixtures of diamines and triamines, more preferably mixtures of isophoronediamine (IPDA) and diethylenetriamine (DETA).

The polyurethanes comprise preferably from 1 to 30 mol %, more preferably from 4 to 25 mol %, based on the total amount of components (b) and (d), of a polyamine having at least two isocyanate-reactive amino groups, as monomers (d).

For the same purpose it is also possible as monomers (d) to use isocyanates having a functionality of more than two. Examples of commercially customary compounds include the isocyanurate or the biuret of hexamethylene diisocyanate.

Monomers (e), which are used additionally if appropriate, are monoisocyanates, monoalcohols, and mono-primary and -secondary amines. Their proportion is in general not more than 10 mol %, based on the total molar amount of the monomers. These monofunctional compounds normally carry further functional groups such as olefinic groups or carbonyl groups, and serve to introduce functional groups into the polyurethane that allow the dispersing or the crosslinking or further polymer-analogous reaction of the polyurethane. Monomers suitable for this purpose are those such as isopropenyl-α,α-dimethylbenzyl isocyanate (TMI) and esters of acrylic or methacrylic acid such as hydroxyethyl acrylate or hydroxyethyl methacrylate.

Coatings having a particularly good profile of properties are obtained in particular when substantially only aliphatic diisocyanates, cycloaliphatic diisocyanates or araliphatic diisocyanates are used as monomers (a).

This monomer combination is outstandingly supplemented, as component (c), by alkali metal salts of diaminosulfonic acids, especially by N-(2-aminoethyl)-2-aminoethane-sulfonic acid and/or its corresponding alkali metal salts, the Na salt being the most suitable, and by a mixture of DETA/IPDA as component (d).

Within the field of polyurethane chemistry it is general knowledge as to how the molecular weight of the polyurethanes can be adjusted through the choice of the proportions of the interreactive monomers and of the arithmetic mean of the number of reactive functional groups per molecule.

Normally the components (a) to (e) and also their respective molar amounts are selected such that the ratio A:B, where
A is the molar amount of isocyanate groups and
B is the sum of the molar amount of hydroxyl groups and the molar amount of the functional groups which are able to react with isocyanates in an addition reaction,
is from 0.5:1 to 2:1, preferably from 0.8:1 to 1.5, more preferably from 0.9:1 to 1.2:1. With very particular preference the ratio A:B is as close as possible to 1:1.

The monomers (a) to (e) employed carry on average usually from 1.5 to 2.5, preferably from 1.9 to 2.1, more preferably 2.0 isocyanate groups and/or functional groups which are able to react with isocyanates in an addition reaction.

The polyaddition of components (a) to (e) for the preparation of the polyurethane takes place preferably at reaction temperatures of up to 180° C., more preferably up to 150° C., under atmospheric pressure or under the autogenous pressure.

The preparation of polyurethanes and of aqueous polyurethane dispersions is known to the skilled worker.

The polymeric binder can also be a polymer obtainable by free-radical polymerization of ethylenically unsaturated compounds (monomers), preferably an emulsion polymer.

The polymer is composed preferably of at least 40% by weight, more preferably at least 60% by weight and, with particular preference, at least 80% by weight of what are called principal monomers.

The principal monomers are selected from $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate and 2-ethylhexyl acrylate.

In particular, mixtures of the (meth)acrylic acid alkyl esters as well are suitable.

Vinyl esters of carboxylic acids having 1 to 20 C atoms are, for example, vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether and vinyl isobutyl ether. Preference is given to vinyl ethers of alcohols comprising 1 to 4 C atoms.

As hydrocarbons having 2 to 8 C atoms and one or two olefinic double bonds mention may be made of ethylene, propylene, butadiene, isoprene, and chloroprene.

Preferred principal monomers are the $C_1$ to $C_{10}$ alkyl acrylates and methacrylates, especially $C_1$ to $C_8$ alkyl acrylates and methacrylates, and vinylaromatics, especially styrene and mixtures thereof.

Likewise preferred as principal monomers are vinyl esters and aliphatic hydrocarbons, and mixtures thereof, for example vinyl acetate, ethylene, and mixtures thereof.

Very particular preference is given to methyl acrylate, methyl methacrylate, ethyl acrylate, n-butyl acrylate, n-hexyl acrylate, octyl acrylate, and 2-ethylhexyl acrylate, styrene, and mixtures of these monomers.

Besides the principal monomers the polymer may comprise further monomers, e.g., monomers containing carboxylic, sulfonic or phosphonic acid groups. Carboxylic acid groups are preferred. Examples that may be mentioned include acrylic acid, methacrylic acid, itaconic acid, maleic acid, and fumaric acid.

Further monomers are, for example, monomers also comprising hydroxyl groups, especially $C_1$-$C_{10}$ hydroxyalkyl (meth)acrylates, and (meth)acrylamide.

Further monomers that may additionally be mentioned include phenyloxyethyl glycol mono(meth)acrylate, glycidyl acrylate, glycidyl methacrylate, and amino (meth)acrylates such as 2-aminoethyl(meth)acrylate.

Further monomers that may also be mentioned are crosslinking monomers.

The polymer is composed more preferably of at least 40% by weight, in particular at least 60% by weight, and very preferably at least 80% by weight of $C_1$-$C_{20}$, especially $C_1$-$C_{10}$, alkyl(meth)acrylates.

In one preferred embodiment the polymer is prepared by emulsion polymerization and is therefore an emulsion polymer.

The polymer can also be prepared, however, by solution polymerization followed by dispersion in water, for example.
The Adhesive:

The adhesive comprises the polymeric binder and the microcapsules. For this purpose the polymeric binder is preferably in the form of an aqueous dispersion. Further additives, and the microcapsules, can be added easily to the aqueous dispersion of the polymeric binder.

The amount of microcapsules is preferably 0.1 to 40 parts by weight, more preferably 0.2 to 20 parts by weight, very preferably 0.5 to 10 parts by weight per 100% by weight of adhesive (solids, without water or other constituents liquid at 21° C. and 1 bar).

The amount of the microcapsules is chosen in particular such that the adhesive comprises preferably 0.0001 to 0.1 mol, preferably 0.0005 to 0.1 mol, more preferably 0.001 to 0.1 mol of carbodiimide groups per 100 g of adhesive (solids); water or other organic solvents with a boiling point below 150° C. at 1 bar are not taken into account in the context of the amount by weight of the adhesive. In particular the amount of carbodiimide groups is not higher than 0.05 mol/100 g of adhesive (solids).

Further additives are, for example, thickeners, flow control assistants, defoamers, and pigments.

The adhesive is preferably a laminating adhesive.

The laminating adhesive can be used to adhesively bond any desired substrates.

It is possible to bond a plurality of flexible substrates to one another, examples being polymer sheets, paper, and metal foils; in particular, flexible substrates of this kind can be bonded to inflexible substrates, examples being plates or other moldings.

With particular preference the process of the invention is a laminating process, in which nonflexible substrates are adhesively bonded (laminated) to a flexible flat substrate.

By a flexible substrate is meant a flat substrate which with an area of 50×50 cm, held parallel to the surface of the earth at one side, bends as a result of its inherent weight.

The substrate is preferably one which can be wound around drums having an external diameter of 80 cm.

The flexible substrates are preferably flat substrates with a thickness of less than 10 mm, in particular less than 5 mm, more preferably less than 0.5 mm, and very preferably less than 0.3 mm.

The substrates may in particular comprise polymer sheets, metal foils, nonwovens made of synthetic or natural fibers, coated or uncoated paper, or else veneers of real or imitation wood.

Particular preference is given to polymer sheets, e.g., films of polyester, such as polyethylene terephthalate, polyolefins such as polyethylene, polypropylene or polyvinyl chloride, of polyacetate, polystyrene or styrene copolymers.

The flexible substrate may have been pretreated, e.g., coated with adhesion promoters. The flexible substrate may also have been constructed from two or more layers; consideration may be given, for example, to a support layer made of the above polymers and, applied to one or both sides of said support layer, protective or decorative coatings; also suitable, in particular, is a multilayer substrate which comprises one layer of foamed polymers.

The nonflexible substrate may be a molding, whose external form is retained even if it is loaded with its inherent weight, by being held, for example, hanging freely, at just a single arbitrary point.

The details above refer to standard conditions (21° C., 1 bar). The nonflexible substrate may be of wood or plastic, e.g., ABS (acrylonitrile-butadiene-styrene). It may, for example, be solid wood or plywood, hardboard panels or medium-density fiberboard (MDF) panels.

The nonflexible substrate may in particular comprise shaped parts constructed of synthetic or natural fibers or chips. The shape of the shaped parts is arbitrary.

For adhesive bonding it is possible first of all to coat the nonflexible substrate with the adhesive and, after drying if appropriate, to laminate the flexible substrate onto it.

In the process of adhesive bonding, however, it is also possible, in particular, to coat the flexible substrate with adhesive. Coating may take place according to customary application methods. Coating is followed by drying, preferably at room temperature or temperatures up to 80° C., in order to remove water or other solvents, after which the coated flexible substrate can be laminated on.

The amount of adhesive applied (to the flexible or nonflexible substrate) is preferably 0.5 to 100 g/m², more preferably 2 to 80 g/m², very preferably 10 to 70 g/m².

The adhesive-coated substrate can be stored virtually ad infinitum, e.g., over a number of weeks and months.

The coated flexible substrate can be wound up after drying, if appropriate, has taken place. Further processing is generally preceded by storage or transportation, so that a time of more than a week, or more than 3 weeks, or in particular more than 6 weeks, or more than 10 weeks, elapses before the further processing.

The coated substrate is storage-stable; that is, even after a storage time of several weeks, the coated substrate can be processed with the same good results.

For adhesive bonding, the parts to be bonded are joined together. The temperature in the adhesive layer is preferably from 20 to 200° C., more preferably from 30 to 180° C. The coated flexible substrate can suitably be heated to corresponding temperatures for this purpose.

Adhesive bonding takes place preferably under pressure, for which purpose the parts to be bonded can be pressed together, for example, with a pressure of from 0.05 to 50 N/mm².

The assemblies obtained feature high mechanical strength even at elevated temperatures (heat stability) or under highly fluctuating climatic conditions (climatic resistance). These goods results are achieved even if the coated flexible substrate has been stored for a long time prior to bonding, e.g., more than 3 months.

Additionally the plasticizer stability, scratch resistance, and blocking resistance are good.

The microcapsule containing the carbodiimide compound is storage-stable in pure form, in water and in the aqueous dispersion, and can be readily emulsified in water.

From the adhesives which comprise the microcapsules it is possible to produce storage-stable films. These films, too, are storage-stable and can be laminated at any later point in time (see above).

The laminating adhesive utility is of particular importance in the automobile or furniture industry, including for example in the adhesive bonding of flexible substrates to automotive interior parts, such as dashboards and interior vehicle trim, or for manufacturing footwear.

EXAMPLES

1. Preparation of Encapsulated Carbodiimides

1.1. Preparation of a Carbodiimide Diisocyanate 500 parts by weight of 1,3-bis(1-methyl-1-isocyanatoethyl)benzene (TMXDI) having an NCO content of 34.4% by weight were heated to 180° C. in the presence of 1.0 part by weight, based on the isocyanate, of 1-methyl-2-phospholene 1-oxide, and the mixture was condensed at this temperature, with evolution of carbon dioxide. When the NCO content was approximately 11% by weight, residues of unreacted TMXDI were distilled off under reduced pressure at a temperature of 180° C.

This gave a polycarbodiimide having an NCO content of 8-7% by weight, which had an —N=C=N— group content of approximately 15% by weight.

1.1.1. Preparation of a Carbodiimide Diurethane with Ethanol

In a stirring flask, 800 g of the polycarbodiimide of Example 1.1, 57 g of ethanol, and 0.1 g of dibutyltin dilaurate (DBTL) were stirred at 90° C. for 300 minutes. The NCO content of the viscous oil obtained was found by titrimetry to be 0% by weight.

1.1.2. Preparation of a Carbodiimide Diurethane with 2-ethylhexanol

In a stirring flask, 800 g of the polycarbodiimide of Example 1.1, 161 g of 2-ethylhexanol, and 0.1 g of dibutyltin dilaurate (DBTL) were stirred at 90° C. for 300 minutes. The NCO content of the viscous oil obtained was found by titrimetry to be 0% by weight.

1.2. Encapsulation of the Carbodiimides

1.2.1. Encapsulation of the Carbodiimide from Example 1.1.1

Water Phase
235 g of water
95 g of a 5% by weight aqueous dispersion of methylhydroxypropylcellulose (Culminal® MHPC 100)
23.8 g of a 10% strength by weight aqueous polyvinyl alcohol solution (Mowiol 15-79)
1.1 g of a 2.5% strength by weight aqueous sodium nitrite solution
Oil Phase
220 g of carbodiimide from Example 1.1.1
12.6 g of methyl methacrylate
5.4 g of n-butyl acrylate
0.38 g of ethylhexyl thioglycolate
0.7 g of a 75% strength by weight solution of tert-butyl perpivalate in aliphatic hydrocarbons
Addition 1
2.69 g of a 10% strength by weight aqueous solution of tert-butyl hydroperoxide
Feed Stream 1
14.15 g of a 1.1% strength by weight aqueous solution of ascorbic acid
Feed Stream 2
0.73 g of a 25% strength by weight solution of NaOH in water
0.72 g of water
Feed Stream 3
3.35 g of a 30% by weight dispersion of Viscalex HV 30 in water
a) The above water phase was introduced as an initial charge at 40° C. Following addition of the oil phase, the batch was dispersed using a high-speed dissolver stirrer at 3500 rpm. 40 minutes of dispersion gave a stable emulsion.
b) While being stirred with an anchor stirrer, the emulsion was heated to 70° C. over a period of 60 minutes, heated to a temperature of 85° C. over the course of a further 60 minutes, and held at that temperature for one hour. Addition 1 was added and the resultant microcapsule dispersion was cooled to 20° C. with stirring over the course of 30 minutes, during which feed stream 1 was metered in.
c) At room temperature feed streams 2 and 3 were added in succession with stirring.

This gives a dispersion having a solids content of 40.5% by weight and an average capsule size of 15 μm.

1.2.2. Encapsulation of the Carbodiimide from Example 1.1.2

Water Phase
235 g of water
95 g of a 5% by weight aqueous dispersion of methylhydroxypropylcellulose (Culminal® MHPC 100)
23.8 g of a 10% strength by weight aqueous polyvinyl alcohol solution (Mowiol 15-79)
1.1 g of a 2.5% strength by weight aqueous sodium nitrite solution
Oil Phase
220 g of carbodiimide from Example 1.1.2
12.6 g of methyl methacrylate
5.4 g of n-butyl acrylate
0.38 g of ethylhexyl thioglycolate
0.7 g of a 75% strength by weight solution of tert-butyl perpivalate in aliphatic hydrocarbons
Addition 1
2.69 g of a 10% strength by weight aqueous solution of tert-butyl hydroperoxide
Feed Stream 1
14.15 g of a 1.1% strength by weight aqueous solution of ascorbic acid
Feed Stream 2
0.73 g of a 25% strength by weight solution of NaOH in water
0.72 g of water
Feed Stream 3
3.35 g of a 30% by weight dispersion of Viscalex HV 30 in water
a) The above water phase was introduced as an initial charge at 40° C. Following addition of the oil phase, the batch was dispersed using a high-speed dissolver stirrer at 3500 rpm. 40 minutes of dispersion gave a stable emulsion.
b) While being stirred with an anchor stirrer, the emulsion was heated to 70° C. over a period of 60 minutes, heated to a temperature of 85° C. over the course of a further 60 minutes, and held at that temperature for one hour. Addition 1 was added and the resultant microcapsule dispersion was cooled to 20° C. with stirring over the course of 30 minutes, during which feed stream 1 was metered in.
c) At room temperature feed streams 2 and 3 were added in succession with stirring.

This gives a dispersion having a solids content of 39.2% by weight and an average capsule size of 20 μm.

2. Preparation of a PU Dispersion

A stirring flask with thermometer and reflux condenser is charged with 600 g (0.30 mol) of polytetrahydrofuran with an OH number of 56, 40.2 g (0.30 mol) of dimethylolpropionic acid, 100 g of acetone, and 0.1 g of dibutyltin dilaurate, and this initial charge is heated to 60° C. 133.4 g (0.60 mol) of isophorone diisocyanate are added and the batch is stirred at 100° C. for three hours. Over the course of 20 minutes it is diluted with 900 g of acetone and cooled to 30° C. The NCO content of the solution was found to be 0.1% by weight. Then 10.1 g (0.10 mol) of triethylamine were added, dispersion was carried out by adding 790 g of water, and the acetone was distilled off under reduced pressure. This gave a finely divided dispersion having a solids content of 50% by weight.

3. Testing

3.1

100 parts by weight of the dispersion from Example 2 were admixed with 12 parts of the capsule dispersion from Example 1.2.1, which was incorporated by stirring with a propeller stirrer for one minute.

3.2.

100 parts by weight of the dispersion from Example 2 were admixed with 12 parts of the capsule dispersion from Example 1.2.2, which was incorporated by stirring with a propeller stirrer for one minute.

3.3. (Comparative)

100 parts by weight of the dispersion from Example 2 were admixed with 5 parts of a carbodiimide prepared according to Example 1 of DE 10 2004 063 380 (carbodiimide based on TMXDI), which was incorporated by stirring with a propeller stirrer for one minute.

The mixtures were applied using a spray gun to MDF panels measuring 290×280 mm, at an application rate of 90 to 100 g/m² (wet), and vented at room temperature for 60 minutes. In a LAMP Multipress thermoforming press from Bürkle, the coated MDF panels were laminated with 350 μm Roxan type 531744 Taunus beech PVC furniture foils.

Laminating Conditions:
Preheating time: 80 seconds
Vacuum time: six seconds
Pressing time: 45 seconds
Pressing temperature: 121° C.
Molding pressure: 4.5 bar
Heat Stability:

The laminated MDF panels were placed in a forced-air drying cabinet, preheated to 60° C., and after an hour the bonding of the foil to the MDF panel was assessed visually for foil contraction at the edge or detachment of the foil. If there was still no significant contraction or detachment, the temperature was raised by 5° C. and the bond was reassessed after a further hour. The temperature reported is the maximum temperature at which the foil contraction is still <=0.3 mm.

Results:
3.1: 75° C.
3.2: 70° C.
3.3: (comparative): 70° C.

Shelf Life of the Mixtures

The mixtures from Examples 3.1., 3.2., and 3.3. were stored at room temperature for twelve weeks. After this time the mixtures from Examples 3.1. and 3.2. were still readily processable and showed a heat stability of 75° C. in each case.

The mixture from Example 3.3. had coagulated after just six weeks and could no longer be tested.

The invention claimed is:

1. A microcapsule wherein
   the capsule wall is formed from an organic polymer and
   the core of the microcapsule consists of one or more carbodiimide compounds containing one or more carbodiimide groups.

2. The microcapsule according to claim 1, wherein the organic polymer is a polymer obtained by free-radical polymerization.

3. The microcapsule according to claim 1, wherein more than 50% by weight of the organic polymer is composed of monomers containing an acrylic or methacrylic group.

4. The microcapsule according to claim 1, wherein the microcapsule has a weight-average particle size of at least 1 μm.

5. The microcapsule according to claim 1, wherein the carbodiimide compound comprises on average 2 to 30 carbodiimide groups per molecule.

6. A crosslinker comprising the microcapsule according to claim 1.

7. A crosslinker for aqueous polymer dispersions comprising the microcapsule according to claim 1.

8. A crosslinker for aqueous polyurethane dispersions or aqueous dispersions of polymers prepared by free-radical polymerization, comprising the microcapsule according to claim 1.

9. A crosslinker in adhesives, paints, varnishes, paper-coating slips or other coating or impregnating compositions, comprising the microcapsule according to claim 1.

10. An adhesive comprising the microcapsule according to claim 1.

11. The adhesive according to claim 10, comprising a polyurethane as binder.

12. The adhesive according to claim 10, comprising 0.1 part to 40 parts by weight of microcapsules per 100 parts by weight of solids wherein constituents are not liquid at 21° C. and 1 bar.

13. A laminating adhesive comprising the adhesive according to claim 10.

14. A method of bonding to a nonflexible substrate a flat substrate selected from the group consisting of polymer sheets, paper, and wood veneer comprising:
   applying the laminating adhesive according to claim 13 to at least one of the non-flexible substrate and the flat substrate, then contacting the flexible substrate and the flat substrate.

15. A microcapsule having a wall and a core, wherein the core contains only one or more carbodiimide compounds, and the carbodiimide compounds are present only in the core,
   wherein the capsule wall consists of an organic polymer, and
   wherein the carbodiimide compounds contain one or more carbodiimide groups.

16. The microcapsule according to claim 15, wherein more than 50% by weight of the organic polymer is composed of monomers containing an acrylic or methacrylic group.

17. The microcapsule according to claim 15, wherein the microcapsule has a weight-average particle size of at least 1 μm.

18. The microcapsule according to claim 15, wherein the carbodiimide compound comprises on average 2 to 30 carbodiimide groups per molecule.

19. A crosslinker comprising the microcapsule according to claim 15.

20. An adhesive comprising the microcapsule according to claim 15.

21. The adhesive according to claim 20, comprising a polyurethane as binder.

22. The adhesive according to claim 10, comprising 0.1 part to 40 parts by weight of microcapsules per 100 parts by weight of solids wherein constituents are not liquid at 21° C. and 1 bar.

23. A microcapsule wherein
   the capsule wall is formed from an organic polymer and
   the core of the microcapsule consisting essentially of one or more carbodiimide compounds containing one or more carbodiimide groups.

24. The microcapsule according to claim 23, wherein the organic polymer is a polymer obtained by free-radical polymerization.

25. The microcapsule according to claim 23, wherein more than 50% by weight of the organic polymer is composed of monomers containing an acrylic or methacrylic group.

26. The microcapsule according to claim 23, wherein the microcapsule has a weight-average particle size of at least 1 μm.

27. The microcapsule according to claim 23, wherein the carbodiimide compound comprises on average 2 to 30 carbodiimide groups per molecule.

28. A crosslinker comprising the microcapsule according to claim 23.

29. An adhesive comprising the microcapsule according to claim 23.

30. The adhesive according to claim 29, comprising a polyurethane as binder.

31. The adhesive according to claim 29, comprising 0.1 part to 40 parts by weight of microcapsules per 100 parts by weight of solids wherein constituents are not liquid at 21° C. and 1 bar.

32. A laminating adhesive comprising the adhesive according to claim 29.

33. A method of bonding to a nonflexible substrate a flat substrate selected from the group consisting of polymer sheets, paper, and wood veneer comprising:

applying the laminating adhesive according to claim 32 to at least one of the non-flexible substrate and the flat substrate, then contacting the flexible substrate and the flat substrate.

\* \* \* \* \*